United States Patent [19]

Brugel

[11] Patent Number: 4,987,171
[45] Date of Patent: Jan. 22, 1991

[54] STABILIZATION OF POLY(ETHER KETONE KETONES)
[75] Inventor: Edward G. Brugel, Wilmington, Del.
[73] Assignee: E. I. Du Pont de Nemours and Company, Wilmington, Del.
[21] Appl. No.: 398,997
[22] Filed: Aug. 28, 1989
[51] Int. Cl.$^5$ .............................................. C08K 5/14
[52] U.S. Cl. .................................. 524/396; 524/397; 525/471
[58] Field of Search ...................... 525/471, 396, 397
[56] References Cited
U.S. PATENT DOCUMENTS
3,767,620 10/1973 Angelo et al. ..................... 260/47 R
4,611,033 9/1986 Maresca ............................. 525/419

FOREIGN PATENT DOCUMENTS
0117539 8/1988 European Pat. Off. .

Primary Examiner—Veronica P. Hoke
Attorney, Agent, or Firm—Paul R. Steyermark

[57] ABSTRACT

Poly(ether ketone ketones), which are important engineering resins, are thermally stabilized by being contacted for at least 15 minutes above their glass transition temperature with an organic hydroperoxide containing at least 0.1 mg of active oxygen per gram, having a boiling point above about 130° C., and degradable between 130° C. and the contacting temperature, the hydroperoxide being made from a precursor comprising at least one benzylic or allylic hydrogen in its molecule.

5 Claims, No Drawings

STABILIZATION OF POLY(ETHER KETONE KETONES)

BACKGROUND OF THE INVENTION

This invention relates to a process for the stabilization of certain poly(ether ketone ketones), which contain units derived from diphenyl ether as well as 1,4-benzenedicarbonyl and 1,3-benzenedicarbonyl units.

Poly(ether ketone ketones), hereinafter sometimes referred to as PEKK's, especially those having the above chemical structure, are well known engineering polymers, which find wide use in certain high value applications such as, for example, in fabricating panels for aircraft interiors. They have high melting points, yet are melt processable and are reasonably well resistant to ignition.

PEKK's are made industrially by Friedel-Crafts catalyzed condensation of diphenyl ether with terephthalyl chloride and isophthalyl chloride in an inert solvent such as, e.g., o-dichlorobenzene, nitromethane, or ethylene chloride. The most commonly used catalyst is aluminum chloride, which always is employed in a large excess. The so-produced PEKK's usually have xanthydrol end groups which result from acylation in the ortho position of diphenyl ether. Those xanthydrol groups are thermally unstable and decompose on heating with the liberation of xanthone and formation of a phenyl free radical, which reacts with the polymer, causing crosslinking and degradation by hydrogen abstraction.

This thermal degradation is illustrated below in the following equation:

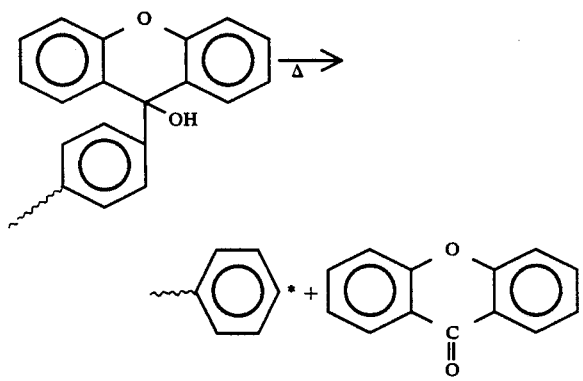

While this elimination of xanthone can be retarded by heating the polymer with formic acid, and thus reducing the xanthydrol groups to xanthene groups, exposure of the polymer to oxygen regenerates xanthydrol, which then rearranges to xanthone. Thus, the formic acid treatment simply slows down the degradation process but does not eliminate it.

It thus is very important to be able to permanently thermally stabilize PEKK's.

BRIEF SUMMARY OF THE INVENTION

According to the present invention, there is provided a process for thermally stabilizing poly(ether ketone ketones), wherein a poly(ether ketone ketone) swollen with an organic liquid is contacted for a period of at least about 15 minutes above its glass transition temperature with an organic hydroperoxide having a boiling point above about 130° C., thermally degradable between about 130° C. and the contacting temperature, containing at least 0.1 mg of active oxygen per gram, and made from a precursor comprising at least one benzylic or allylic hydrogen in its molecule, and separating the so-treated poly(ether ketone ketone) from the liquid.

DETAILED DESCRIPTION OF THE INVENTION

Organic hydroperoxides are well known and some are commercially available. Usually, they can be made in situ by a reaction of an appropriate precursor with a source of active oxygen, for example, hydrogen peroxide. Preferred hydroperoxides contain more than 0.5 mg/g of active oxygen. Those hydroperoxides are made from a variety of precursors. Those having a benzylic hydrogen may be represented, for example, by the following formula:

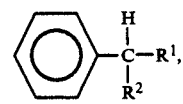

where $R^1$ and $R^2$ are lower alkyl groups, especially methyl groups, and the benzene ring may be further substituted, especially with alkyl groups. Precursors containing allylic hydrogen include, for example, limonene, tetralin, and undecene-1. The preferred precursor is 1,3,5-triisopropylbenzene (1,3,5-TIB). Chiyoda et al. U.S. Pat. No. 4,455,440 describes one of the processes suitable for making TIB trihydroperoxides. TIB can be purchased from Aldrich Chemical Co. The hydrogen of each isopropyl group of TIB can be oxidized to a hydroperoxy group, —O—OH, using a hydrogen peroxide solution or another suitable peroxide or by passing a stream of oxygen through a solution of TIB in a suitable solvent. All such procedures are well known to those skilled in the art. Hydrogen peroxide itself cannot be used as a stabilizing compound because it decomposes below the temperature at which stabilization is required. Poly(ether ketone ketones) of interest in the present invention have glass transition temperatures in the neighborhood of 130°–110° C. and must be stabilized at temperatures above that range. However, hydrogen peroxide decomposes below 130° C.

The amount of active oxygen in the stabilizing hydroperoxide can be determined, for example, by gas chromatography, calibrating the system for the monohydroperoxide and noting the hydroperoxide peak's appearance and disappearance. In the case of the hydroperoxides from TIB, all three hydroperoxides are quite stable, but the monohydroperoxide is sufficient to effect complete PEKK stabilization, so that the presence of the other two hydroperoxides would indicate only the degree of oxidation of the precursor but not the degree of stabilization that will occur. Further, active oxygen can be determined in a known manner by a reaction with sodium or potassium iodide in an acidic medium and titration of liberated iodine.

PEKK, which is to be stabilized, is always prepared in a solvent, as explained above. In the industrial practice, the original solvent normally is removed by washing with a lower-boiling organic liquid, such as, for example, methanol, in which it is insoluble. The organic liquid swelling this PEKK thus may be methanol, or a mixture of methanol with the original reaction solvent, or any other suitable organic liquid or combination of organic liquids.

This invention is now illustrated by examples of certain representative embodiments thereof, where all parts, proportions, and percentages are by weight, unless otherwise indicated.

EXAMPLE 1

Preparation of Polymer

A stirred 3-liter glass reactor was charged with 87.60 g (0.515 mole) of diphenyl ether (99.9% purity, Dow Chemical Co.), 70.70 g (0.35 mole) of terephthalyl chloride (Du Pont Technical grade), 30.30 g (0.15 mole) of isophthalyl chloride (Du Pont Technical grade), 1.30 g (0.005 mole) of 1,3,5-benzenetricarboxylic acid chloride (trimesyl chloride), and 2200 ml of o-dichlorobenzene. The mixture was cooled to 0°-5° C. and 202 g (1.51 moles) of anhydrous aluminum chloride (Witco ACL-0008) was added while the temperature was maintained between 0° and 5° C. Upon completion of the aluminum chloride addition, the reaction temperature was increased to 100° C. at a rate of approximately 10° C./min. The reaction was held at 100° C. for 30 minutes and then allowed to cool to room temperature. Once at room temperature, the agitation was stopped and the o-dichlorobenzene was removed by means of a vacuum filter stick. Methanol (1200 ml) was added slowly with agitation, keeping the temperature below 45° C. The mixture was stirred for 30 minutes and filtered. The polymer product was washed two times with methanol and dried in vacuum for 12 hours at 180° °C. The polymer exhibited a melt index, with 5 minutes preheating at 360° C., of 0 g/10 minutes, which indicated a high degree of crosslinking.

COMPARATIVE EXAMPLE 1

Stabilization by Formic Acid Treatment

Approximately 100 ml of the wet, methanol washed, particulate polymer from Example 1 was mixed with 10 ml of formic acid. The mixture was dried in a vacuum oven at 180° C. for 12 hours. The polymer exhibited a melt index, with 5 minutes preheating at 360° C. of 250 g/10 minutes. The polymer thus was not excessively crosslinked.

COMPARATIVE EXAMPLE 2

1,3,5-TIB Containing Less than 0.1 mg/g of Active Oxygen

Approximately 100 ml of the wet, methanol washed, particulate polymer from Example 1 was placed in a 500-ml, 3-neck, round bottom flask fitted with a condenser, thermowell, and nitrogen purge. Two hundred fifty ml of oxidized 1,3,5-TIB (containing less than 0.1 mg/g of active oxygen) was added. The mixture was heated at 180°-200° C. for 2 hours and cooled to room temperature. The polymer was filtered from the solution, washed twice with 500 ml of acetone, and dried in a vacuum oven at 180° C. for 12 hours. The polymer exhibited a melt index, with 5 minutes preheating at 360° C., of 0 g/10 minutes. This polymer thus was highly crosslinked.

EXAMPLE 2

1,3,5-TIB Containing More than 0.1 mg/g Active Oxygen

Approximately 100 ml of the wet, methanol washed, particulate polymer from Example 1 was placed in a 500 ml, 3-neck, round bottom flask fitted with a condenser, thermowell, and nitrogen purge. Two hundred fifty ml of oxidized 1,3,5-TIB (Aldrich Chemical Co., containing more than 0.1 mg/g of active oxygen as determined by gas chromatography) was added. The mixture was heated at 180°-200° C. for 2 hours and cooled to room temperature. The polymer was filtered from the solution, washed twice with 500 ml of acetone, and dried in a vacuum oven at 180° C. for 12 hours. The polymer exhibited a melt index, with 5 minutes preheating at 360° C., of 243 g/10 minutes. This polymer obviously was not excessively crosslinked.

EXAMPLE 3

Stabilization with TIB/3% Hydrogen Peroxide Solution

Approximately 100 ml of the methanol washed polymer from Example 1 was placed in a 500 ml, 3-neck, round bottom flask fitted with a condenser, thermowell and nitrogen purge. Two hundred fifty ml of 1,3,5-TIB (Aldrich Chemical Co., containing less than 0.1 mg/gm of active oxygen as determined by gas chromatography) and 100 ml of 3% hydrogen peroxide solution were added. The mixture was heated at 180°-200° C. for 2 hours and cooled to room temperature. The polymer was filtered from the solution, washed two times with 500 ml of acetone and dried in a vacuum oven at 180° C. for 12 hours. The polymer exhibited a melt index, with 5 minutes preheating at 360° C., of 360 g/10 minutes.

EXAMPLE 4

Stabilization with 1,3,5-TIB/30% Hydrogen Peroxide Solution

Approximately 100 ml of the methanol washed polymer from Example 1 was placed in a 500 ml, 3-neck, round bottom flask fitted with a condenser, thermowell and nitrogen purge. Two hundred fifty ml of 1,3,5-TIB (Aldrich Chemical Co., containing less than 0.1 mg/gm of active oxygen as determined by gas chromatography) and 10 ml of 30% hydrogen peroxide solution were added. The mixture was heated at 180°-200° C. for 2 hours and cooled to room temperature. The polymer was filtered from the solution, washed two times with 500 ml of acetone and dried in a vacuum oven at 180° C. for 12 hours. The polymer exhibited a melt index with 5 minutes preheating at 360° C., of 373 g/10 minutes.

Examples 3 and 4 thus show that a hydrogen peroxide solution can generate 1,3,5-TIB hydroperoxide in situ, and this 1,3,5-TIB hydroperoxide stabilizes PEKK. If hydrogen peroxide decomposed before it had a chance to oxidize 1,3,5-TIB to the corresponding hydroperoxide, proper stabilization of PEKK would not have been observed.

EXAMPLE 5

Oxidation of 1,3,5,-TIB

Five hundred ml of 1,3,5-TIB and 500 ml of water were placed in a 2 liter, 3-neck, flask fitted with a condenser, thermowell and air purge. The mixture was heated to 80°-90° C. while air was continuously passed through the solution. The active oxygen content of the TIB phase was monitored by gas chromatography on a 30-m capillary glass column coated with methylsilicone. The column was programmed to equilibrate for 5 minutes at 35° C. and then was heated to 100° C. at the rate of 10° C./min. An internal standard was used. When the active oxygen content reached 1 mg/g, approximately 4–8 hours, the mixture was cooled to room temperature. The TIB layer was decanted from the water layer and stored for further use.

EXAMPLE 6

Stabilization with Oxidized 1,3,5-TIB

Approximately 100 ml of the methanol washed polymer from Example 1 was placed in a 500 ml, 3-neck, round bottom flask fitted with a condenser, thermowell and nitrogen purge. Two hundred fifty ml of 1,3,5-TIB from Example 5 (containing 1.1 mg/g active oxygen, as determined by gas chromatography) was added. The mixture was heated at 180°–200° C. for 2 hours and cooled to room temperature. The polymer was filtered from the solution, washed two times with 500 ml of acetone and dried in a vacuum oven at 180° C. for 12 hours. The polymer exhibited a melt index, with 5 minutes preheating at 360° C., of 250 g/10 minutes.

EXAMPLE 7

Additional Compounds Suitable for Stabilizing PEKK

Approximately 100 ml of the methanol-washed polymer from Example 1 was placed in a 500 ml, 3-neck, round bottom flask fitted with a condenser, thermowell and nitrogen purge. Two hundred fifty ml of one of the compounds from Table I (containing less than 0.1 mg/g of active oxygen as determined by gas chromatography) and 100 ml of 3% hydrogen peroxide solution were added. The mixture was heated at 180°–200° C. for 2 hours and cooled to room temperature. The polymer was filtered from the solution, washed two times with 500 ml of acetone and dried in a vacuum oven at 180° C. for 12 hours. The melt indices for each compound are shown in Table I.

TABLE I

| Examples 7–12 | | |
|---|---|---|
| Example | Hydroperoxide Precursor | Melt Index (g/10 min) |
| 7 | 1,3-Diisopropylbenzene | 61 |
| 8 | Tetralin | 392 |
| 9 | 1-Phenylnonane | 191 |
| 10 | 1,4-Diisopropylbenzene | 89 |
| 11 | Limonene | 522 |
| 12 | Undecene | 237 |

COMPARATIVE EXAMPLES 3–5

Similar Compounds Unsuitable as Stabilizing Agents

Approximately 100 ml of the methanol-washed polymer from Example 1 was placed in a 500 ml, 3-neck, round bottom flask fitted with a condenser, thermowell and nitrogen purge. Two hundred fifty ml of one of the compounds from Table II (containing less than 0.1 mg/gm of active oxygen as determined by gas chromatography) and 100 ml of 3% hydrogen peroxide solution were added. The mixture was heated at 180°–200° C. for 2 hours and cooled to room temperature. The polymer was filtered from the solution, washed two times with 500 ml of acetone and dried in a vacuum oven at 180° C. for 12 hours. The melt indices for each compound are shown on Table II.

TABLE II

| Comparative Examples 3–6 | | |
|---|---|---|
| Example | Hydroperoxide Precursor | Melt Index (g/10 min) |
| 3 | 2-Ethylhexanol | 0 |
| 4 | Phenol | 0 |
| 5 | 1,3,5-Tri-t-butylbenzene | 0 |
| 6 | o-Dichlorobenzene | 0 |

I claim:

1. A process for thermally stabilizing poly(ether ketone ketones), wherein a poly(ether ketone ketone) swollen with an organic liquid is contacted for a period of at least about 15 minutes above its glass transition temperature having the range of about 130°–140° C. with an organic hydroperoxide having a boiling point above about 130° C., thermally degradable between about 130° C. and the contacting temperature, containing at least 0.1 mg of active oxygen per gram, and made from a precursor comprising at least one benzylic or allylic hydrogen in its molecule, and separating the so-treated poly(ether ketone ketone) from the liquid.

2. A process of claim 1 wherein the precursor is 1,3,5-triisopropylbenzene.

3. A process of claim 1 wherein the active oxygen content in the hydroperoxide is more than about 0.5 mg/g.

4. A process of claim 3 wherein the active oxygen content in the hydroperoxide is at least 1 mg/g.

5. A process of claim 1 wherein the hydroperoxide is made in situ by a reaction of the precursor with hydrogen peroxide.

* * * * *